March 31, 1970

L. H. SCHOMAKER 3,503,553

FUEL METERING COMBUSTION CONTROL SYSTEM WITH
AUTOMATIC OXYGEN COMPENSATION

Filed Nov. 13, 1967

INVENTOR.
LOUIS H. SCHOMAKER

BY
Eugene C. Knoblock
ATTORNEY

INVENTOR.
LOUIS H. SCHOMAKER
BY
ATTORNEY

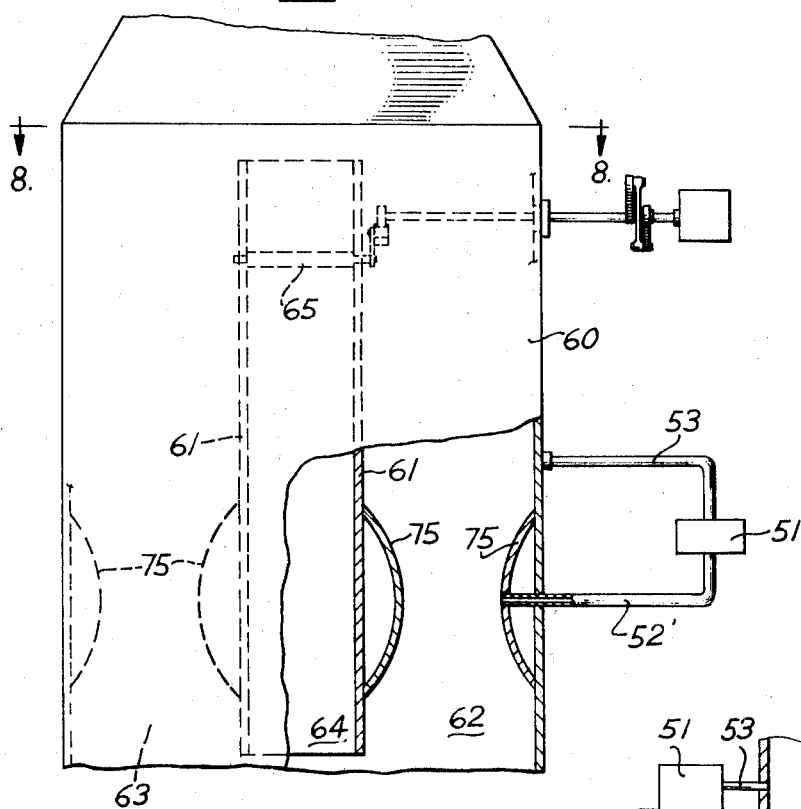
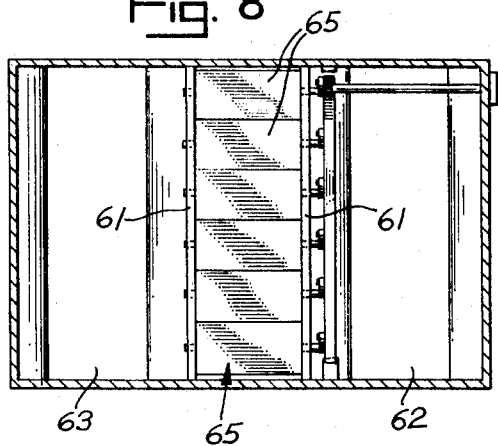
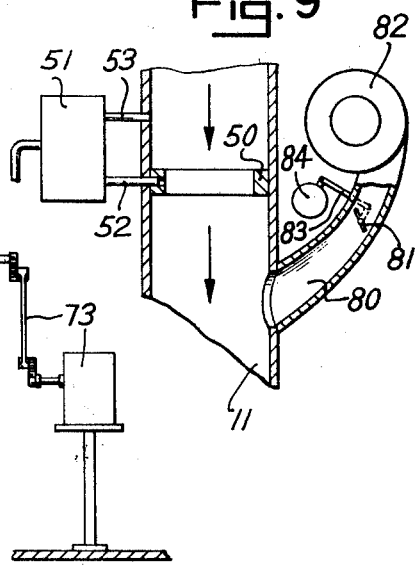
INVENTOR.
LOUIS H. SCHOMAKER
ATTORNEY

United States Patent Office 3,503,553
Patented Mar. 31, 1970

3,503,553
FUEL METERING COMBUSTION CONTROL SYSTEM WITH AUTOMATIC OXYGEN COMPENSATION
Louis H. Schomaker, Michigan City, Ind., assignor to The Hays Corporation, Michigan City, Ind.
Filed Nov. 13, 1967, Ser. No. 682,296
Int. Cl. F23n 3/06, 1/08, 5/00
U.S. Cl. 236—14                        6 Claims

ABSTRACT OF THE DISCLOSURE

A combustion control system for controlling the supply of fuel and air to a combustion unit in a selected ratio and responsive to the output of said combustion unit, wherein the air supply means includes an additional trimming control responsive only to measurement of the oxygen content of the products of combustion of the combustion unit and effective to control only a limited proportion of the total potential air supply.

---

This invention relates to a fuel metering combustion control system with automatic oxygen compensation.

The control of a combustion system for optimum efficiency requires control of the fuel supply and the air supply in a manner correlated to the functioning of the combustion system. In controlling the air supply, use of excessive air must be avoided to insure efficient use of fuel and to avoid heat losses through the stack. The use of insufficient air will result in partial combustion only, and the generation of explosive gas mixtures which are dangerous and which also are inefficient.

Various methods have been utilized heretofore to attempt to attain efficient and economical combustion control, and these have entailed the use of apparatus operating electronically or hydraulically or pneumatically. In most of these systems, oxygen control in the combustion system is not sufficiently accurate to secure optimum efficiency.

Prior systems have included positioning control systems and metering type of combustion control systems. Positioning control systems utilize signals from a fuel controller responsive to system output to regulate the fuel supply means and the air supply means. Such systems are not accurate if the pressure of the air or the pressure of the fuel in the supply line should vary. Attempts have been made to modify positioning control systems to increase efficiency by providing a feedback signal to the fuel controller from the fuel supply means and a feedback signal from the air supply means to the air controller. Another system modification has entailed the use of a rebalancing slide wire.

These modified systems are commonly referred to as metering type of combustion controls and they add to a positioning control system means for measuring the rate of flow in the fuel line and in the air line and impose signals derived from such measurements as feedbacks to modulate the fuel controller and the air controller, respectively. The measurements are commonly made by introducing an orifice plate in each of the air line and the fuel line and connecting to each line a device measuring the pressure difference across the orifice and transmitting this measurement to the correlated controller.

A metering control is more efficient than a positioning control because it compensates for pressure variations in the fuel line and the air line, that is, it permits response to variations of fuel volume in the fuel line and of air volume in the air line. However, when the signals from the flow transmitters in association with each of the fuel line and the air line are transmitted directly to the fuel controller and the air controller, and where the output of the oxygen controller is fed directly to a ratio box, various problems arise, particularly in starting a boiler or a combustion system. Thus the oxygen analyzer utilized for the oxygen controller can have too strong a control of the entire combustion system and cause wide swings or variations in the fuel-air ratio which are greater than are desired for rapid achievement of operation of the system at maximum efficiency.

The present invention is designed to provide a method and means to limit the effect of an oxygen controller upon a combustion system, so as to merely trim or modify the basic combustion control system and the air-fuel ratio thereof, and this constitutes the primary object of the invention.

A further object of the invention is to provide a controller which operates only within a predetermined control ratio range so that it can control only a selected part of the total potential air flow but can never control the air supply completely.

A further object is to provide a control for regulating a selected part of a potential air flow to a combustion system so that the air supply means will never operate to supply enough air to the system to blow out a fire or to supply so little air that an explosive condition of combustibles within the furnace can occur.

A further object is to provide a method and means of this character which can be used with any combustion control system whether of the electronic type, the pneumatic type or the hydraulic type.

A further object is to provide a method and means of this character wherein a predetermined control ratio range is achieved by controlling only a small percentage of the total potential air supply through the oxygen controller responsive to the products of combustion of the combustion system, leaving the control of the remainder of the potential air supply to the operation of apparatus responsive to the output of the combustion system.

Other objects will be apparent from the following specification.

In the drawings:

FIG. 7 is a plan view of an air line with parts shown in section, illustrating another type of air control used in my invention.

FIG. 8 is a sectional view taken on line 8—8 of FIG. 7.

FIG. 9 is a schematic view illustrating still another embodiment of my invention.

In the present invention a device is incorporated in the combustion system which supplements and is separate from the normal or usual air measuring device. This separate device functions to limit the effect of the usual air measuring device upon the system within selected limits.

The device incorporates by-pass means having a volume of a selected ratio or proportion to the volume of the air flow passage under the control of the usual air measuring device of a combustion system in a manner to allow a fine incremental air volume control by an oxygen controller in a manner to produce a vernier type of adjustment. This device does not alter or connect to or interact into the set point of a fuel-air ratio system. It cannot cause an unsafe condition in the fuel-air ratio system in the event of failure of an oxygen analyzer or oxygen analyzer sampling system, and it cannot cause an unsafe condition due to operational error. The device is designed to alter the velocity profile in an air duct to insure a better fuel-air mixture. In the system, signals from the air and fuel measuring devices can either be linear or squared because the oxygen compensation is fully independent.

Figure 1:
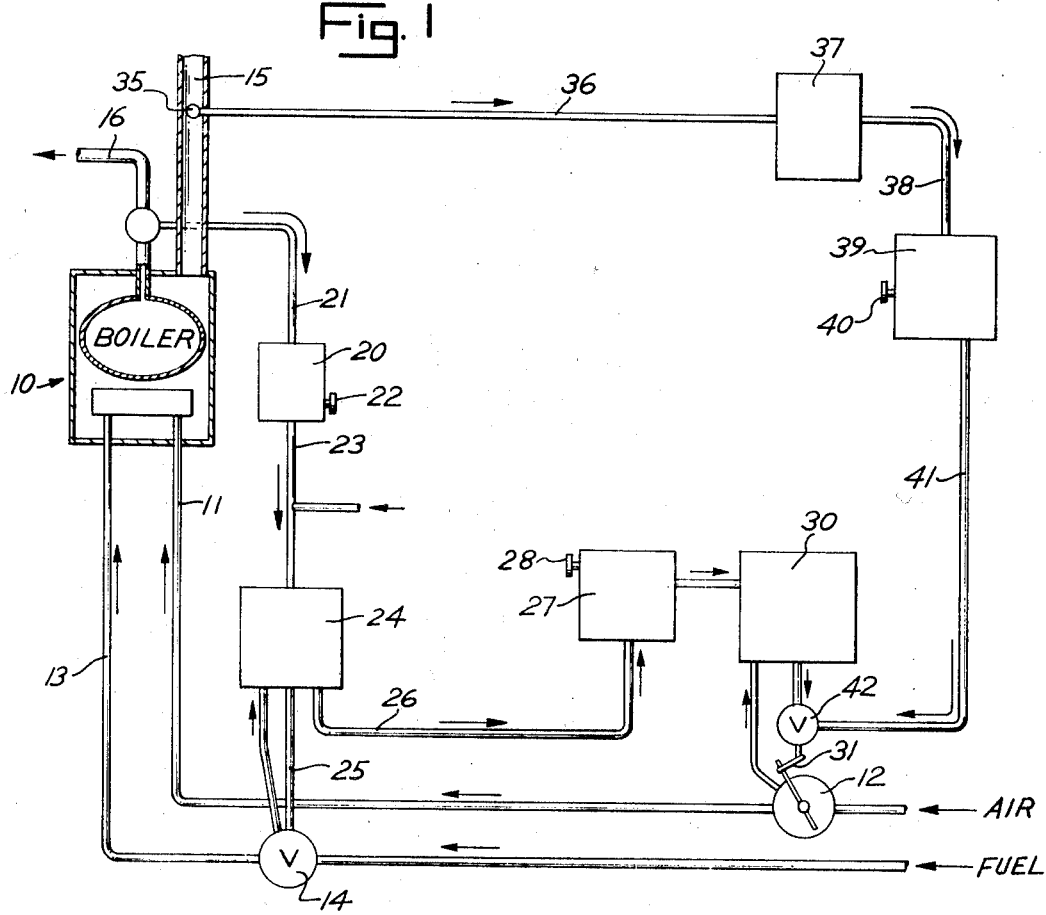
FIG. 1 is a schematic view of a combustion control system utilizing my invention.

Referring to the drawings and particularly to FIG. 1 wherein a combustion control system utilizing this invention is illustrated, the numeral 10 designates a boiler or other combustion unit having an air supply line 11 with air supply control 12, said air supply line being connected to a blower (not shown). The boiler or combustion unit also has a fuel supply line 13 controlled by a fuel supply valve 14. The boiler or combustion unit has a stack 15 for discharge of the products of combustion and, in the case of a boiler, has a steam discharge line 16.

The steam pressure of the boiler or other output element of a combustion system is fed to a controller 20, as through a line 21 connected to the steam discharge line 16. The controller may be of the type adapted to be adjusted by a "set point" knob 22. A line 23 from controller 20 extends to fuel controller 24 which has an operative connection with the fuel supply valve 14 at 25. This connection may include the usual feedback arrangement. Similarly, it will be understood that the fuel controller 24 may be responsive not only to a single controller 20 but also to a plurality of controllers associated with other combustion units by lines connected to and branching from line 23. It will be understood that the set point knob 22 of controller 20 can be adjusted to respond to steam pressure or system output element in the line 21 in a manner to reduce the rate of fuel supply to the boiler or combustion unit 10 through fuel supply line 13 if the pressure or output element exceeds a set value or to increase the fuel supply if the steam pressure or output element reduces below the value set.

The signal or control impulse passing through line 23 and fuel controller 24 is also transmitted through a line 26 to a ratio box 27 which preferably has a knob or other setting means 28 and which can be set through said means 28 to regulate the fuel-air ratio to be supplied to the boiler or combustion device. A signal from the ratio box 27 is transmitted to an air controller 30 which has an operating connection with the air supply control 12. This operative connection may include an adjustable link 31 of a type well known in the art, and there may be a feedback arrangement between the air supply control 12 and the air controller 30.

For the purpose of determining the efficiency of combustion in the boiler 10 or combustion unit, a probe 35 may be mounted in the stack 15 and connected with a line 36 in a manner to take a sample of the products of combustion and transmit the same to an oxygen analyzer 37 which preferably is of the type which reads the percentage of oxygen in the flue gases. A signal from the oxygen analyzer 37 is transmitted through a line 38 to an oxygen controller 39 which preferably has an adjusting means 40. The signal from the oxygen controller 39 passes through line 41 to suitable trimming means 42 associated with the means for controlling the air supply control 12 in a manner to control only a selected part of the total potential air flow through the air line 11 to the boiler or combustion unit 10.

Figure 2:
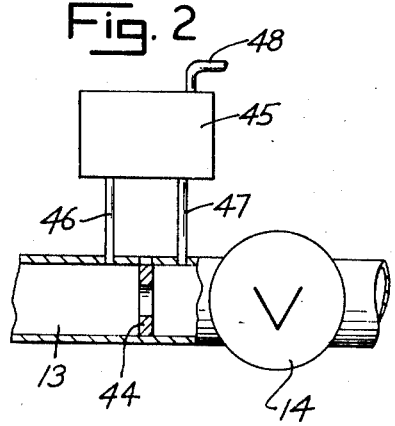
FIG. 2 is a schematic view illustrating a metering control for a fuel supply.

The provision of feedback means in association with the fuel controller 24 and the air controller 30 characterize a metering type of combustion control by adding to the control system means for measuring the rate of flow in the fuel line and in the air line and imposing the signal derived from such a measurement as a feedback to modulate the fuel controller and the air controller respectively. FIG. 2 illustrates schematically a feedback associated with the fuel line 13. An orifice plate 44 is interposed in the fuel supply line 13 and a flow responsive transmitter 45 which is connected by lines 46 and 47 to the line 13 at opposite sides of the orifice plate transmits a signal to the fuel controller 24 through line 48.

Figure 3:
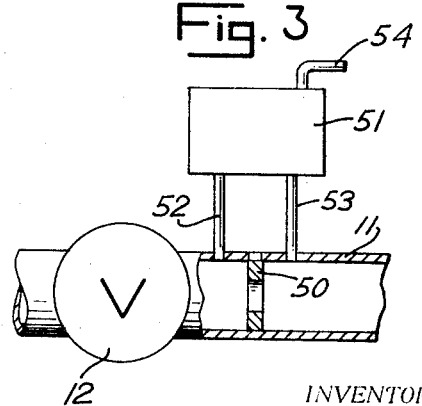
FIG. 3 is a schematic view illustrating a metering control for an air supply.

The feedback arrangement associated with the air supply control is illustrated schematically in FIG. 3 wherein an orifice plate 50 is interposed in the air supply line 11 and a flow responsive transmitter 51 is connected by lines 52 and 53 at opposite sides of the orifice plate and transmits a flow responsive signal through a line 54 to the air controller 30.

Figure 4:
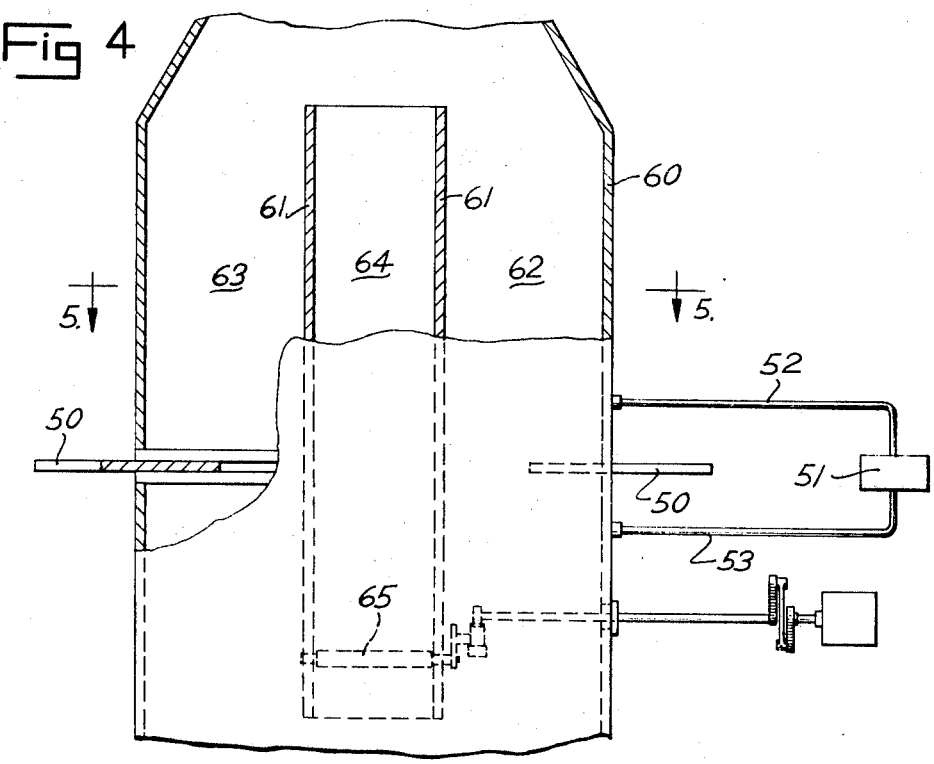
FIG. 4 is a plan view of an air line with parts shown in section, illustrating one type of air control utilized in my invention.
Figure 5:
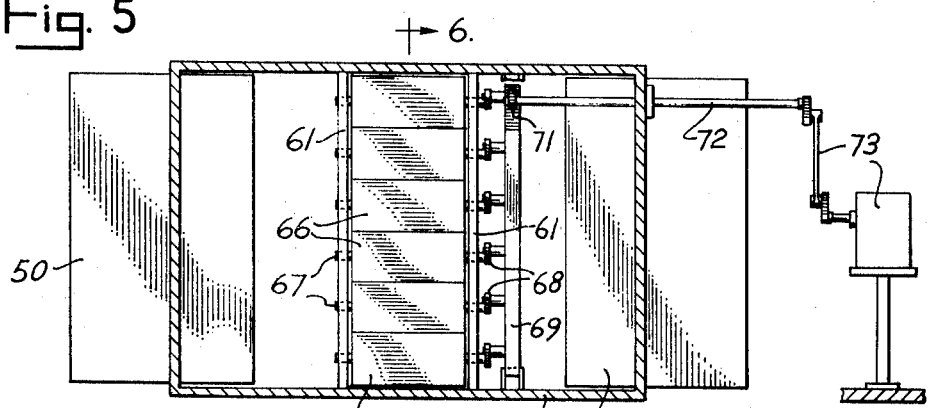
FIG. 5 is a transverse sectional view of an air line taken on line 5—5 of FIG. 4.
Figure 6:
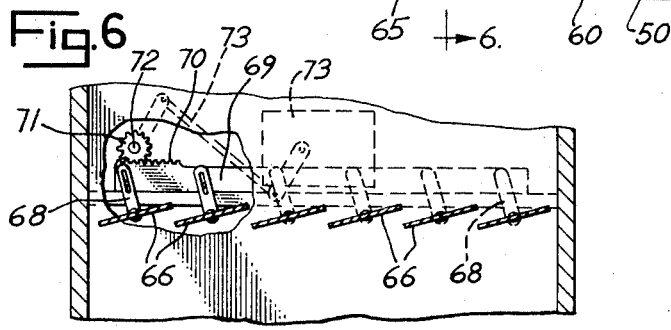
FIG. 6 is a sectional view taken on line 6—6 of FIG. 5.

The accomplishment of the desired trim action by the air controller to control only a selected part of the total potential air flow can be accomplished in various ways. One embodiment of means for this purpose is illustrated in FIGS. 4, 5 and 6. In this embodiment, an air duct 60 which constitutes the line 11 has a portion which is spanned by a pair of spaced longitudinal partitions or walls 61 so as to define therein at one point thereof three longitudinal passages 62, 63 and 64, respectively, each of which is in open communication with the other passages of the duct at both ends thereof. Adjustable plates 50 are carried by the duct to project into the passages 62 and 63, and the lines 52 and 53 are connected to the duct at opposite sides of one of these plates 50 and extend to the flow responsive transmitter 51. The arrangement provides for control of the flow of air through the passages 62 and 63 by suitable means (not shown) for adjusting the setting of plates 50 responsive to the air controller 30.

Damper means 65 are positioned in the passage 64 and as here shown may constitute one or a plurality of damper members 66, each pivoted at 67, as at opposite partitions 61. Arms or links 68 extend from the pivots and are interconnected by a bar or link 69. Suitable means may be provided to adjust the position of the connecting bar 69 and of the dampers, such means being here shown in FIG. 6 as constituting a toothed rack portion 70 of the bar with which meshes a pinion 71 carried by a shaft 72 rockable by an actuator 73 energized by a signal from the oxygen controller 39 and flowing through line 41.

It will be seen that in this arrangement, the normal control for the combustion system is operative to control the flow of air through the passages 62 and 63, and that the volume or area of the passage 64 constitutes only a part of the total potential volume of air flow. The flow through passage 64 is controlled by the damper means 65 under the sole control of the oxygen controller 39. Thus the oxygen controller 30 can trim the air supply only as to a limited portion of the total potential air supply, the proportion being determined by the ratio of the cross sections of passages 62, 63 and 64. The percentage which the area of passage 64 bears to the combined cross sectional areas of the passages 62 and 63 will be a function of a predetermined percentage of the excess air requirements of the combustion system at maximum settings. This arrangement permits a highly sensitive and accurate control of the amount of air supplied to the combustion system to insure sufficient air to support combustion and to avoid excess air. This oxygen compensation does not alter the operation of or interconnect into the primary or output responsive means, such as parts 20, 24, 27 and 30 which usually determine the fuel-air ratio in the particular combustion system control being utilized. Therefore, regardless of the type of the controls in the combustion system, i.e. whether they be pneumatic, hydraulic or electronic, the supplemental air supply control can be used effectively.

Another construction of the oxygen compensation means is illustrated in FIGS. 7 and 8 wherein parts similar to those shown in FIGS. 4, 5 and 6 bear the same reference numerals. In this construction the air duct 60 has spaced longitudinal partitions or walls 61 defining the passages 62, 63 and 64 which are in open communication at their opposite ends. Damper means 65, such as pivoted dampers 66, are mounted in passage 64 to be adjusted by actuator 73 responsive to the oxygen controller 39. In this construction each of the passages 62 and 63 has restrictors 75 mounted therein so as to define a venturi within each of said passages 62 and 63. Flow responsive transmitter 51 is connected by the line 52' at the throat or restriction of the venturi in one passage and line 53 from the transmitter is connected to the passage spaced from the restriction 75. It will be seen that this device permits trimming of the air supply in the manner described above without interference with the primary air control in the combustion system through the passages 62 and 63.

Another embodiment of the invention is illustrated in FIG. 9. In this construction the air line 11 has the orifice plate 50 therein and lines 52 and 53 in different relations to said plate connect the line to the flow responsive transmitter 51. A branch line or duct 80 is connected to the line 11 preferably downstream of the orifice plate 50 and has a damper 81 therein. Branch duct 80 is supplied with air from a blower 82 which may be independent of the blower supplying air to line 11. The damper 81 may have a linkage or operating connection 83 with an actuator 84 which is responsive to the signal from the oxygen controller 39 delivered through line 41. In this arrangement it will be seen that a part of the air flow within the air supply line 11 is controlled by the usual air supply of the combustion system and a part of the air supply derived from blower 82 through the branch duct 80 is trimmed or regulated by the setting of the damper 81. Alternatively, control of trimming additional air may be effected by any other means, such as a speed control (not shown) for the blower 82 responsive to the oxygen controller 39.

The foregoing apparatus makes possible a novel method of combustion control as follows. The flow of air to support combustion is controlled primarily by multiple air flow control means for the combustion system. A trimming portion of the air supply passes through a passage communicating with the primary air supply and is regulated independently of the regulation of the primary air supply. The primary air flow controller receives a system-output-responsive signal from fuel measuring and controlling devices, which signal may pass through a ratio device to modify the value of the fuel controlling signal to produce an air flow in selected proportion to the fuel supply rate. The air flow control signal is obtained by measuring the differential pressure across the primary air flow channel. The signal from the air flow differential pressure measurement transmitter becomes the process variable signal of the air flow controller. The air flow controller may have two modes of operation, namely, proportional and reset. A change in the fuel signal causes the controller to vary the prime air supply to maintain the desired fuel-air ratio in the metering system.

A sample of the gaseous product of combustion from the combustion unit is passed through an oxygen analyzer to obtain a signal whose value can be expressed as the percentage of oxygen content in the gases analyzed. The oxygen signal so derived becomes a process variable signal for an oxygen or excess air controller which preferably has a set point permitting it to be set manually to a desired value as determined by design conditions in the combustion unit. The output signal of the oxygen controller positions an actuator to move the members in the air supply which act to trim the air supply or regulate the supplemental air supply. In this way the opening or closing, that is, the increasing or decreasing of the supplemental air supply causes a change in the total air flow to the combustion chamber that is not measured by the air flow differential pressure transmitter, but is effective to modulate and maintain a selected oxygen concentration in the flue gas in the stack.

This method and apparatus is adaptable to any conventional or standard metering combustion control system and will maintain the absolute minimum of excess air consistent with furnace requirements over the full range of the installation. Control of excess air in turn results in saving of fuel, minimum maintenance requirements for the combustion system, and maximum efficiency of the combustion system.

While the preferred embodiments of the invention have been illustrated and described, it will be understood that changes in the construction may be made within the scope of the appended claims without departing from the spirit of the invention.

I claim:
1. In a method of controlling the air-fuel ratio of a combustion system wherein means responsive to the output of the system control the rate and ratio at which fuel and air are supplied to the system, the improvement consisting of the steps of dividing the air supply to provide two separate passages merging to supply a common inlet of a combustion system and in one of which passages said output-responsive means controls air flow, measuring the oxygen content of the products of combustion of said system and producing a signal proportional to said measurement, and varying the air supply in said other passage in direct and sole response to signals derived from said oxygen measuring means.

2. The method defined in claim 1, wherein both of said passages are supplied by a common source of air under pressure and the air supply in said other passage is varied by modulating the cross sectional area of said other passage.

3. The method defined in claim 1, wherein each of said passages has a source of air under pressure separate from the other.

4. An oxygen compensatng means for use in a combustion system having means responsive to the output of the system for controlling the rate at which and the ratio in which fuel and air are supplied to the system, comprising means producing a signal responsive to variations in the oxygen content of the products of combustion of the system, means defining two independent paths of flow of air to a single inlet of said system, one of said paths being controlled by said output-responsive means to modulate a fraction of the air supplied to said single inlet, and means for modulating the flow of air in said other path in direct and sole response to said signal-producing means to thereby modulate a second fraction of the air supplied to said single inlet.

5. An oxygen compensating means as defined in claim 4, wherein said flow path defining means constitutes a duct having partition means at a selected portion thereof defining two separate passages supplied from a common source and providing two flow paths merging in downflow relation to said partition means, damper means in the passage defining said other path, and damper actuating means responsive to said signal-producing means.

6. An oxygen compensating means as defined in claim 4, wherein said flow path defining means constitutes a duct means defining two separate merging air flow passages, and means for varying the rate and volume of air flowing in the passage defining said other flow path solely in response to said signal-producing means in upflow relation to a merging zone of said flow paths.

References Cited

UNITED STATES PATENTS

| 1,562,087 | 11/1925 | Griswold | 236—15 |
| 2,285,564 | 6/1942 | Brooke et al. | 236—15 |
| 3,074,644 | 1/1963 | Geniesse | 236—15 |
| 3,243,116 | 3/1966 | Dijt et al. | 236—14 |

WILLIAM E. WAYNER, Primary Examiner

U.S. Cl. X.R.
236—15; 431—76